United States Patent
Segev et al.

(10) Patent No.: US 7,254,228 B2
(45) Date of Patent: Aug. 7, 2007

(54) METHOD AND SYSTEM FOR EFFECTIVE UTILIZING THE SWITCHING CAPACITY OF LOCAL EXCHANGES

(75) Inventors: Aharon Segev, Ganei Tikva (IL); Alexander Bronstein, Rishon Lezion (IL)

(73) Assignee: ECI Telecom Ltd., Petach Tikva (IL)

( * ) Notice: Subject to any disclaimer, the term of this patent is extended or adjusted under 35 U.S.C. 154(b) by 1038 days.

(21) Appl. No.: 10/372,773

(22) Filed: Feb. 26, 2003

(65) Prior Publication Data

US 2003/0133407 A1 Jul. 17, 2003

Related U.S. Application Data

(63) Continuation of application No. PCT/IL01/00890, filed on Sep. 24, 2001.

(30) Foreign Application Priority Data

Sep. 20, 2000 (IL) .................................... 138761

(51) Int. Cl.
*H04M 7/00* (2006.01)
(52) U.S. Cl. ................. 379/221.07; 379/219
(58) Field of Classification Search ........... 379/221.07, 379/219, 221.01, 221.02, 221.03, 22.01, 379/88.17; 370/356, 352
See application file for complete search history.

(56) References Cited

U.S. PATENT DOCUMENTS

| | | | |
|---|---|---|---|
| 5,583,929 A | 12/1996 | Ardon | |
| 5,703,879 A | 12/1997 | Proctor et al. | |
| 6,480,898 B1 * | 11/2002 | Scott et al. | 709/238 |
| 6,510,219 B1 * | 1/2003 | Wellard et al. | 379/221.01 |
| 6,700,885 B1 * | 3/2004 | Proctor et al. | 370/356 |
| 2003/0031168 A1 * | 2/2003 | Scioscia | 370/352 |
| 2003/0039335 A1 * | 2/2003 | Pharoah et al. | 379/22 |
| 2006/0140176 A1 * | 6/2006 | Farris et al. | 370/352 |

FOREIGN PATENT DOCUMENTS

| | | |
|---|---|---|
| EP | 0 708 570 A2 | 4/1996 |
| WO | WO 97/39563 | 10/1997 |
| WO | WO 98/39880 A1 | 9/1998 |

OTHER PUBLICATIONS

Verhoeyen "Delivering Voice Services Over DSL" *ALCATEL Telecommunications Review* 4:244-249 (2000).

* cited by examiner

*Primary Examiner*—William J. Deane, Jr.
(74) *Attorney, Agent, or Firm*—Browdy and Neimark, PLLC

(57) ABSTRACT

To support a changing volume of a voice-grade traffic in an access network having a local exchange with a limited capacity, provide two or more access networks each having subscribers and associated local exchange with a limited capacity; each capable of dividing traffic, outgoing from its subscribers, into the voice-grade traffic portion and data traffic portion, and capable of directing the data traffic portion to a packet network while directing the voice-grade traffic portion to a PSTN network via associated local exchange. Second, detecting the overload condition on one local exchange (LE1). Third, find a remaining one (LE2) of the local exchanges in normal load condition. Fourth, partially diverting the voice-grade traffic intended for the local exchange LE1 and passing the diverted voice-grade traffic to its destination via the packet network and the local exchange LE2.

24 Claims, 5 Drawing Sheets

METHOD AND SYSTEM FOR EFFECTIVE UTILIZING THE SWITCHING CAPACITY OF LOCAL EXCHANGES

This is a continuation of copending International parent application No. PCT/IL01/00890, filed Sep. 24, 2001.

FIELD OF THE INVENTION

The present invention relates to telecommunication systems and more particularly, to a method and system for sharing switching capacity of switched telephone networks for utilizing their shared resources.

BACKGROUND OF THE INVENTION

The main problem that is nowadays intrinsic to the telecommunication networks is a problem of switching capacity overload due to the growing amount of calls transmitted over the networks. Bulky streams of calls and call attempts flowing to and from subscribers of the networks result in degradation of quality of the basic service which is offered by telephone networks, namely—the voice service. Up to a particular moment, regular telephone networks, such as PSTN, equipped with conventional public switches (which can also be called Local Switches, Local Exchanges or Central Offices) coped with more and more increasing use of telephone lines to handle data traffic (for example, on Internet), though very quickly the required bandwidth and the growing volume of the data traffic posed a serious problem and led to the necessity that the traffic load be divided. The main idea of sharing the traffic load was to transmit the high rate data, in the digital form, via separate networks suitable for transmitting data, such as packet networks like ATM, IP, Frame relay and the like.

One of practical solutions for overcoming the above problem is described in a publication WO97/39563, which proposes a method and apparatus for providing bypass networks in a telephone system. The bypass networks permit all forms of traffic on a telephone system, including various forms of data traffic, to be handled without resulting in significant degradation in service to customers while facilitating the controlled growth of the telephone system to handle rapidly increasing classes and levels of traffic. This is accomplished by providing one or more bypass networks in the system, with at least one class of traffic being diverted through such bypass network so as to utilize shared resources of the system. In the WO 97/39563, the idea of bypassing is described and illustrated with respect to the data traffic constituting the source of congestion in the system, while for the voice traffic of a particular local switch subscribers the basic route via the local loop and the local switch is preserved.

There is, however, another problem in the modem combined networks which has not yet been recognized enough and thus has not yet met its solution. Today, the traditional voice traffic, normally handled by its appropriate local loops and local switches, can be "protected" from invasion of new developing classes of traffic by diverting the data traffic to bypass networks. However, while these new developing classes of traffic have led to developing of new networks for transmission, the voice traffic still remains in the frame of the same capacities of local loops and local exchanges, which were calculated and built for some previously existed conditions. Furthermore, the need of temporary increasing/decreasing of the load may cause service degradation in the switched telephone networks.

Historically, a local switch capacity was usually selected with certain traffic load assumptions based on voice traffic characteristics so as to normally avoid overloading of the network. For example, depending on location, there might be four to eight times as many subscribers as there is switch capacity at a central office. Such systems have worked reasonably well with the number of lines and central office capacity being incrementally increased as the number of subscribers increases and only in rare circumstances does such a network become so overloaded that it is not possible to serve new call attempts properly (i.e., during peak traffic periods or anomalous conditions such as on holidays or where there is a catastrophe in the area).

It should also be noted that expenses for increasing capacity of a central office (local switch) are usually very high and operators would prefer not to upgrade them but to support the existing networks infrastructure.

OBJECT OF THE INVENTION

It is therefore an object of the present invention to provide a solution for easy development of a subscriber's area of a local switch, in order to enable more voice calls to be placed simultaneously, without extending capacity of the local switch.

SUMMARY OF THE INVENTION

According to a first aspect of the invention, the above object can be achieved by providing a method for supporting a changing volume of a voice-grade traffic in an access network having a local exchange with a limited capacity the method comprising steps of:

providing two or more access networks, each having its subscribers and its associated local exchange with a limited capacity; each of the access networks being capable of dividing traffic, outgoing from its subscribers, into the voice-grade traffic portion and data traffic portion, and capable of directing the data traffic portion to a packet network while directing the voice-grade traffic portion to a PSTN network via said associated local exchange; wherein the PSTN network and the packet network are respectively common for said two or more access networks, defining an overload condition of a local exchange as a condition when traffic there-through equals to a predetermined threshold forming at least a portion of the local exchange capacity, defining a normal load condition of the local exchange as a condition when traffic there-through is below said predetermined threshold, detecting the overload condition on one of said local exchanges, the overload local exchange being indicated LE1;

finding a remaining one of said local exchanges being in the normal load condition, the non-overload local exchange being called LE2;

partially diverting the voice-grade traffic intended for the local exchange LE1 and passing the diverted voice-grade traffic to its destination via said packet network and the local exchange LE2, thereby reducing volume of the voice-grade traffic via the LE1.

The overload condition definition may be performed based on a particular predetermined daytime schedule. For example, during working hours, one local exchange serving subscribers of an industrial zone is considered overloaded, while another local exchange serving a residence area is considered to be in the normal condition. After the working hours, the residential local exchange may easily become overloaded, while the industrial local exchange will definitely be under-loaded. The beginning/termination of the peak hours might be determined based on a preliminarily defined value of the threshold load of the local exchange or based on dynamically monitoring the local exchange by the control plane in the network. In the most simple case (predefined management schedule), after the load fluctuation profile is studied and an appropriate schedule is composed, the latter may become a tool for the load sharing. Using the above method, the two local exchanges may form shared resources of the converged network and assist one another during the alternating peak hours.

In more complex mechanisms, the overload condition may be detected during monitoring the local exchange and/or equipment of the access network associated with the local exchange, and this condition is stated when the predetermined threshold is determined. For example, the predetermined threshold can be a value reflecting proportion of busy lines in the local exchange, busy channels in the interface between the local exchange and its access node(s), proportion of calls rejected by the local exchange, etc.

The step of finding the non-overload local exchange can be performed in different ways. For example, the search may be performed in a sequential manner, using messages sent from the overloaded local exchange to other ones in the converged network according to a predetermined list (a decentralized manner). Another way is by applying to a central management entity, which collects the load status information from all local exchanges of the system and is thereby capable of determining a non-overload one for sharing the voice-grade traffic with the overloaded one (a centralized manner).

Each of said access networks extends between its local subscribers and the local exchange originally predestined to connect the subscribers to the PSTN network. The term of voice-grade traffic covers both a part of a digital format traffic flow outgoing from the subscribers' side to the side of a local exchange, and a traffic flow incoming the access network (and its local exchange) from the PSTN network and addressed to the subscribers of said local exchange.

The step of partially diverting the voice-grade traffic via the overload local exchange can be performed by at least one of the following two ways:

at least partially diverting the voice-grade traffic portion intended to enter the LE1 from the side of its subscribers (i.e., created by outgoing calls) and passing it via the packet network and then via said LE2 to reach the PSTN network;

at least partially diverting the voice-grade traffic intended to enter the LE1 from the side of PSTN (i.e., created by incoming calls) and passing it via the LE2 and then via the packet network to reach the subscribers of the LE1.

According to a second aspect of the present invention, there is also provided a system for supporting a changing volume of a voice-grade traffic in an access network having a local exchange with a limited capacity, wherein said access network forms part of a converged network comprising a PSTN network, a packet network and at least one additional access network, each of the access networks having its subscribers and its associated local exchange with a limited capacity and each being capable of dividing traffic, outgoing from its subscribers, into the voice-grade traffic stream and data traffic stream, and capable of directing the data traffic stream to the packet network while directing the voice-grade traffic stream to the PSTN network via said associated local exchange;

the system comprising:

control means capable of distinguishing between an overload condition and a normal condition of the local exchanges, and operative to cause at least partial diversion of the voice-grade traffic, previously intended for handling by the overload local exchange, and passing said diverted traffic via said packet network and a local exchange being in the normal load condition, wherein the overload condition of a local exchange is a condition when traffic there-through equals to a predetermined threshold forming at least a portion of the local exchange capacity, and the normal load condition of a local exchange is a condition when traffic there-through is below said threshold.

According to one embodiment of the system, said control means comprise a plurality of control blocks respectively situated at said local exchanges and equipment associated therewith, wherein each of the control blocks is capable of monitoring a particular local exchange and its associated equipment, determining its load condition, and of applying to another local exchange to initiate said diversion if the overload condition is determined in said particular local exchange. The control blocks may use proprietary or standard protocols for communication there-between.

Alternatively, the control means may constitute a central Network Control Management unit (NCM) capable of collecting load status information from the local exchanges and the associated equipment and controlling said diversion accordingly.

The NCM can be preprogrammed to consider any of the exchanges as overloaded during a particular period (hours, days, etc) according to a predetermined time schedule, and to consider it in the normal load condition when the time period terminates. It is understood that the time schedule always reflects fluctuations of the traffic load.

Alternatively, the NCM may provide continuous monitoring of the local exchanges' load condition. To do that, the system may comprise one or more load condition monitoring means (LCM) capable of continuously checking current load of respective said local exchanges, detecting the overload condition whenever it appears and informing the NCM accordingly. At each local exchange, the LCM function may be performed using the local exchange data base, or by other data bases e.g., of an access node or a gateway associated with the local exchange.

In practice, the LCM functions might be performed by the control blocks situated at the local exchanges and the associated equipment.

As has been mentioned above, the converged network suitable for the invention comprises two or more access networks. Each of the access networks is typically provided with an access node comprising multiplexer/demultiplexer means. Typically, the access node constitutes a DSL Access Multiplexer—DSLAM), being capable of receiving a digital format traffic flow received from the corresponding subscribers (e.g., in the form of one or more xDSL lines) and sorting said flow into a data traffic stream and the voice-grade traffic stream (i.e., telephone traffic including both voice and fax traffic), transmitted as follows: the data traffic stream via said packet network to its addressee, and the voice traffic stream—via a gateway to its associated local exchange (LE) and further to the PSTN network. The gateway may be integrated with the appropriate DSLAM, but may be configured separately, co-located with the local exchange.

According to the invention, the system is characterized in that the access node (DSLAM), while sorting the digital format traffic flow received from the subscribers into the data traffic and the voice traffic streams, is capable of controllably changing (reducing and then increasing up to a particular limit) the proportion of the voice traffic stream extracted from said flow for diverting at least a portion of the "potential" voice traffic.

The diverted traffic can controllably be transmitted from the DSLAM-1 of the overloaded local exchange LE1, via the packet network:

either to the DSLAM-2 of another (non-overloaded) local exchange LE2, then via the corresponding gateway to its non-overloaded local exchange, or directly to the gateway of the non-overloaded local exchange LE2.

On the other hand, the system may be provided with switching means (such as a Tandem Switch), to controllably divert part of the voice-grade traffic incoming an overloaded local exchange (LE1) from the PSTN network, to another local exchange (LE2).

When the overload condition is determined for one of the local exchanges LE1, while there is a local exchange LE2 for which it is not, the control means should be capable of instructing at least one of the following two groups of equipment to partially divert the voice-grade traffic incoming the overloaded local exchange:

1). Tandem Switch in the PSTN interconnected (directly or via other co-Tandem Switches) with said overloaded LE1 and non-overloaded LE2 local exchanges—to controllably divert at least part of calls primarily intended to the overloaded local exchange LE1, to the non-overloaded local exchange LE2, instruct the LE2 to accept the diverted calls and transmit them to its associated DSLAM-2, (or via gateway of DSLAM-2 to DSLAM-1), instruct said DSLAM-2 (if received the diverted calls) to pass said calls to the DSLAM-1 of the overloaded LE-1 for transmitting said diverted calls to the subscribers of the overloaded LE-1;

2). Instruct DSLAM-1 of the overloaded local exchange LE1 to reduce the volume of voice traffic "extractable" from the total digital format data flow and transmit the "non-extracted" voice portion of the traffic flow" via the packet network in the digital format, together with the original data traffic stream. This non-extracted at least a portion of the voice traffic, which is not transferred to its associated local exchange (LE1), is thereby diverted via the packet network to another local exchange (LE2) interconnected with the PSTN. To divert the voice traffic in the digital format from the packet network to the LE2, it should be passed through the LE2 gateway either directly, or via another multiplexer/demultiplexer (DSLAM-2) of the system.

The same concept of sharing the voice-grade switching traffic load by utilizing shared resources can be implemented on yet another level of the converged network.

As follows from the above description, a group of subscribers are connected to their local exchange via an access node (such as DSLAM) which communicates with the local exchange using an interface, such as a standard interface V5.2. When a particular access node (AN) is the only access node of its local exchange (LE), capacity of the interface there-between can be considered equal both to the local exchange capacity (actually, such a capacity is defined by the number of channels available in the interface; some channels not belonging to the interface may exist but can be neglected), and to the access node capacity.

It is understood, that the local exchange may be provided with more than one access nodes to serve more than one groups of subscribers, and communicate with the access nodes via their respective interfaces. The local exchange capacity in this case will be defined by the total capacity of these interfaces (or total capacity of its access nodes).

As has been described above and will further be clarified and illustrated in the detailed description, the proposed diversion of the voice-grade traffic is usually performed by means of re-routing such a traffic from one access node to another via a common packet network.

According to yet another aspect of the invention, there is provided a method for supporting a changing volume of a voice-grade traffic in an access node connected to a local exchange via an interface having a limited capacity, the method comprising steps of:

providing two or more of said access nodes, each having its subscribers and its associated local exchange; each of said access nodes being capable of dividing traffic, outgoing from its subscribers, into the voice-grade traffic portion and data traffic portion, and capable of directing the data traffic portion to a packet network while directing the voice-grade traffic portion to a PSTN network via its associated local exchange; wherein the PSTN network and the packet network are respectively common for said two or more access nodes, defining an overload condition of an access node as a condition when traffic there-through equals to a predetermined threshold forming at least a portion of capacity of the interface between the access node and its associated local exchange, defining a normal load condition of the access node as a condition when traffic there-through is below said predetermined threshold, detecting the overload condition on one of said access nodes, the overload access node being indicated AN1;

finding one of the remaining access nodes being in the normal load condition when the AN1 is the overload condition, the non-overload access node being called AN2;

partially diverting the voice-grade traffic intended for the AN1 and passing the diverted voice-grade traffic to its destination via said packet network and the access node AN2, thereby reducing volume of the voice-grade traffic via the overload access node AN1.

The AN1 and AN2 may belong to different local exchanges, though there is an option that both AN1 and AN2 are associated with one and the same local exchange. The access nodes belonging to one local exchange use one another as shared resources.

In a typical configuration, where each local exchange LE is associated with one access node AN, the term "capacity of a local exchange" is understood as capacity of interface between the local exchange and its associated access node. Actually, for this particular embodiment, when speaking about the overload or the normal load condition, we will mean the overload/normal load condition of a particular local exchange. In this case, the local exchanges serve shared resources to one another.

In accordance with the above-mentioned method, there is also provided a system for supporting a changing volume of a voice-grade traffic in an access node communicating with a local exchange via an interface having a limited capacity, wherein said access node forms part of a converged network comprising a PSTN network, a packet network and at least one additional access node; each of the access nodes having its subscribers and its associated local exchange communicating with the access node via a limited capacity interface, and each being capable of dividing traffic, outgoing from its subscribers, into the voice-grade traffic stream and data traffic stream, and capable of directing the data traffic stream to the packet network while directing the voice-grade traffic stream to the PSTN network via said associated local exchange;

the system comprising:

control means capable of distinguishing between an overload condition and a normal condition of the access nodes, and operative to cause at least partial diversion of the voice-grade traffic, previously intended for handling by an overload access node, and passing said diverted traffic via said packet network and another access node being in the normal load condition, wherein the overload condition of an access node is a condition when traffic there-through equals to a predetermined threshold forming at least a portion of said interface capacity, and the normal load condition of a local exchange is a condition when traffic there-through is below said threshold.

Preferably, the access node mentioned above and having the defined capabilities is a Digital Subscriber Line Access Multiplexer (DSLAM).

According to one embodiment of the system, said control means may constitute a plurality of logical circuits respectively incorporated in the access nodes; each of the logical circuits being capable of monitoring a particular access node, determining its load condition, and of applying to another access node to initiate said diversion of voice-grade traffic if the overload condition of the particular access node is determined. Such a system would operate according to a decentralized type of control.

Alternatively, said control means may comprise a central network control and management entity capable of performing a centralized control based on information on the load status collected from the access nodes.

The proposed concept of sharing the voice-grade traffic load allows not only to handle voice calls safely in any peak conditions, but more important—to expand the number of subscribers of the mentioned central office without expanding the central office's capacity, which is very often the requirement in practice. By dynamically diverting a portion of the overflow voice calls in the form of data to another shared resource of the network, the problem is resolved by the traffic load sharing and more effective utilizing of the shared resources' capacity in the combined network.

The term PSTN network should be understood not only as a Public Service Telephone Network, but also as a conventional telephone switched network, which is not obligatory public. The term packet network covers a plurality of modem data-oriented networks comprising networks ATM, Frame Relay, IP and the like.

Further aspects and details of the present invention will be described as the description proceeds.

BRIEF DESCRIPTION OF THE DRAWINGS

The above invention will further be described and illustrated with the aid of the following non-limiting drawings in which.

DETAILED DESCRIPTION OF PREFERRED EMBODIMENTS

Figure 1:
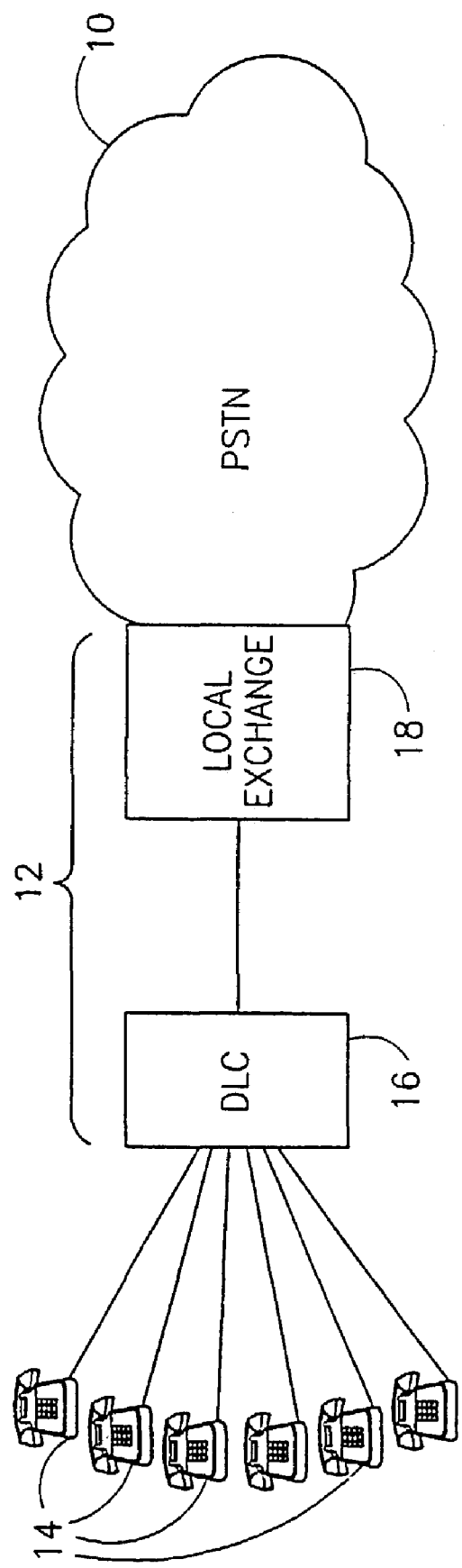
FIG. 1 (prior art) is a schematic pictorial representation of the widely known PSTN architecture with a conventional access network.
Figure 2:
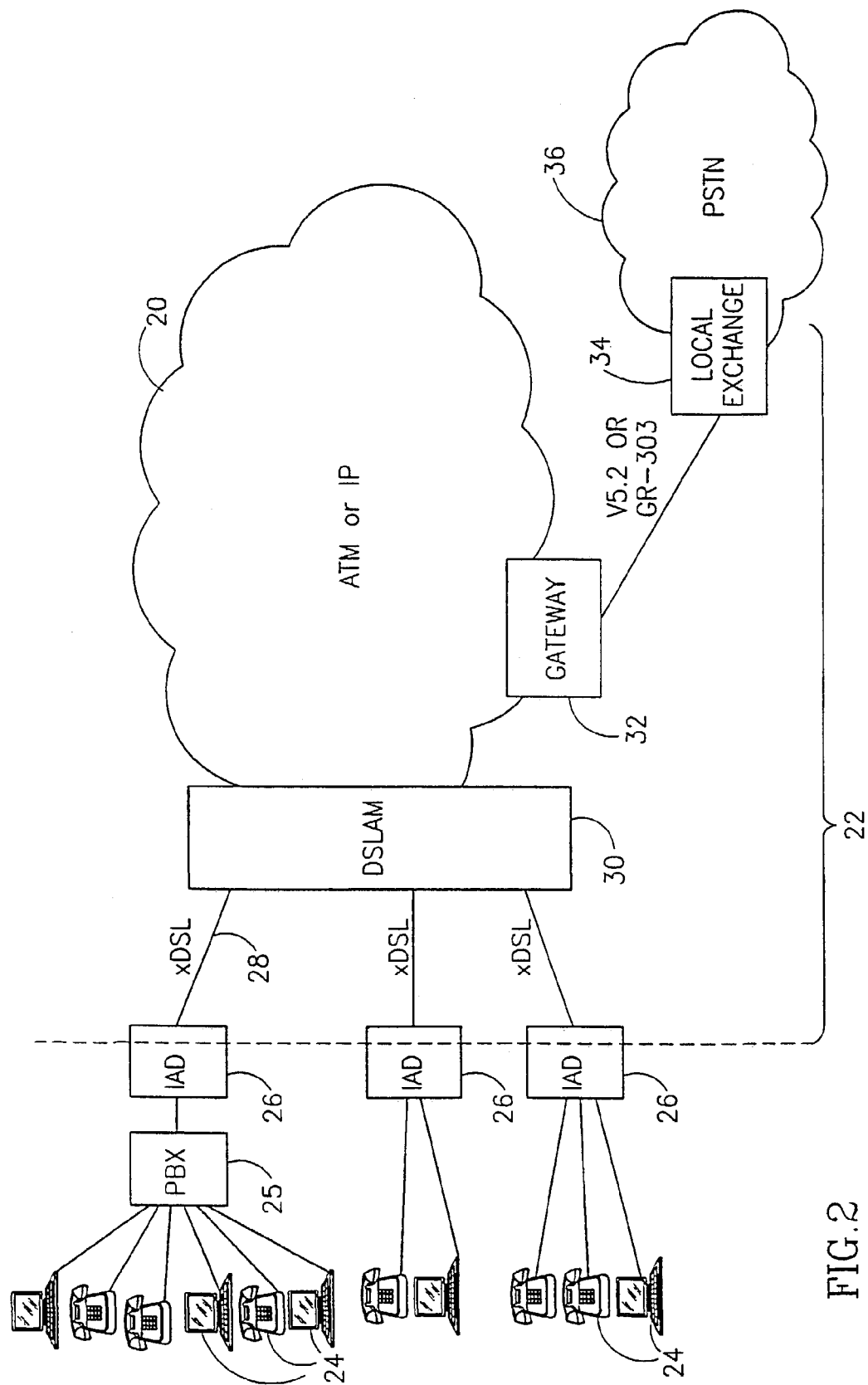
FIG. 2 (prior art) is a pictorial representation of a modem converged network where the PSTN network and the packet network are accessed via an access network utilizing xDSL lines and DSLAM/Gateway architecture.

FIG. 1 is a schematic illustration of a classic architecture of a public switching service telephone network (PSTN) 10 with one access network (schematically marked 12) enabling subscribers 14 to be connected to any destination via the PSTN network. The subscribers 14 are schematically shown as telephone terminal devices, but usually include telephones, fax machines, PBXs and computers via modems. The terminal devices are connected via a Digital Loop Concentrator Device 16 to a Local Exchange or Central Office (LE or LE) 18. The digital loop carrier system derives multiple channels, typically 64-Kbps voice channels, from a single four-wire distribution cable running from the central office (LE) to a remote site. The DLC 16 and LE 18 usually communicate via a standard interface like V5.2 or GR.303. In the architecture shown in FIG. 1, subscriber 14 is compelled to transmit data via the "slow" voice-grade channel available in the access network and in the PSTN. The trend of increasing the volume of data traffic results in that both the LE and the PSTN suffer from overload more and more, and in that both the data traffic service and the voice service degrade. FIG. 2 illustrates a modern access network 22 converged with a packet network 20 (ATM-network in this particular embodiment) offering a technical solution for faster transmission of new types of services. Packet networks (ATM, Frame relay, IP network, etc.) are adapted for transmitting packets of digital information. Subscribers 24, which may be grouped by one or more PBX (Private Branch Exchange) 25, are connected to a number of Integrated Access Devices (IAD) 26 which, via respective Digital Subscriber Lines (DSL) 28 are interconnected with an access node (DSLAM) 30. It should be understood that DSL is a generic name for a family of digital lines (also called xDSL) being provided by LE and local telephone companies to their subscribers. These include, for example, ADSL, SDSL, VDSL, etc. DSLAM 30 is responsible for splitting the incoming xDSL traffic flow into two streams: a data traffic stream to be directed via the packed switched network 20, and a voice/fax traffic stream intended to be fed to a Gateway 32, which can either be integrated with the DSLAM, or form a separate unit. The Gateway converts the voice traffic stream, obtained in the digital format, into the form understood by a local exchange (LE) 34 to which subscribers of the access network 22 belong. Actually, DSLAM can be understood as interconnected with the local exchange LE via a standard interface such as V5.2. The local exchange 34 communicates with a conventional PSTN network 36 for transmitting the voice calls.

Figure 3:
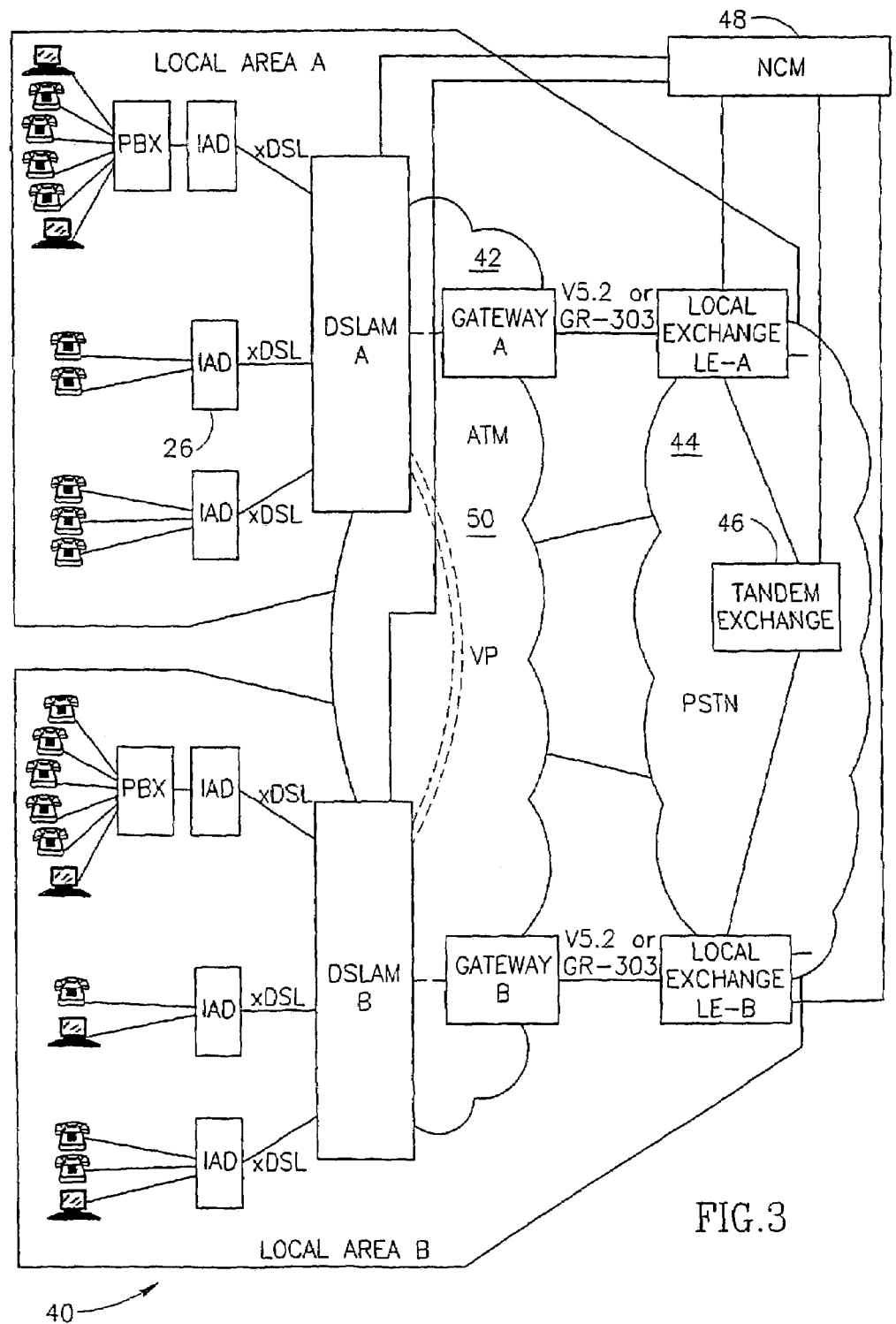
FIG. 3 is a pictorial representation of one embodiment of the proposed novel architecture where a number of access networks interact with the converged network via shared resources.

FIG. 3 illustrates one embodiment of the newly proposed configuration 40 of the converged network enabling the purpose of the invention to be achieved. The configuration comprises at least two so-called local areas: local area A and local area B. Each of the local areas may be considered a separate access network of the PSTN. Each of the local areas comprises components similar to those illustrated in FIG. 2 i.e., multiple subscribers connected via xDSL lines to its local access node AN (DSLAM in this case) connected to its associated local exchange (LE) via a local Gateway. Each local area's local exchange (LE) supports voice traffic between its subscribers and the PSTN network. Both DSLAMs (DSLAM-A and DSLAM-B) cooperate with one and the same Packet network (say, ATM network) 42. Local exchanges LE-A and LE-B servicing the areas A and B respectively, are both located in the common PSTN network marked 44. The local exchanges LE-A and LE-B are both connected to one or more controllable Tandem Switches (only one switch is shown and marked 46). In this particular embodiment, the control means responsible for sharing the traffic load are shown as a central Network Control and Management unit (NCM) 48 performing centralized control of the system.

The object of the invention is achieved by providing the following traffic load sharing mechanism between the local exchanges LE-A and LE-B. For example, voice traffic in the LE-A of the Local Area A may increase during specific peak hours. Simultaneously, LE-B of the local area B might handle relatively low traffic since this time period is not a peak time at the area B.

With respect to outgoing calls, e.g., the calls entering LE-A from the side of subscribers of the area A, the following actions can be performed by the proposed system:

signal of the LE-A overload is obtained at NCM 48; (this signaling information may be produced, for example, from detecting that a predetermined threshold number of the LE-A lines are busy (off-hook), or from a timer indicating the beginning of area A peak hours, statistically—say, based on a number of rejected calls, etc.;

when NCM obtains confirmation that LE-B is not overloaded at this particular period of time, it informs LE-B that an extra-traffic, which does not relate to its subscribers, will be forwarded to LE-B and should not be rejected;

NCM 48 will issue instructions to DSLAM-A and DSLAM-B to prepare reserve or semi-permanent virtual paths VP (or virtual circuits VC) 50 there-between for transferring an extra traffic via the packet switching network 42;

DSLAM-A will limit a portion of voice traffic stream to be directed to Gateway-A; Say, it may be accomplished by diverting any new voice calls, entering DSLAM-A from xDSL, to DSLAM-B via the VP or VC 50, while marking this diverted calls as an extra-outgoing traffic (the marking can be provided either in-band or out-of-band);

DSLAM-B will receive the extra-outgoing, traffic, recognize it as the traffic to be forwarded to the Gateway -B together with its own voice-grade traffic stream, Gateway will transmit the extra-outgoing traffic in the flow of its own voice traffic stream to LE-B, LE-B, being previously instructed by NCM 48, forwards the voice extra-outgoing traffic of the local area A to the PSTN network 44, as necessary.

For incoming calls (those coming from the PSTN network and intended, say, to subscribers of LE-A) the following scenario will take place:

the NCM 48 receives indication that LE-A is overloaded;

NCM 48 simultaneously confirms that LE-B is not in the overload condition and instructs LE-B that it is going to receive stranger calls which should not be rejected;

NCM 48 instructs DSLAMs to create there-between reserve VC (VT) 50 for extra traffic, (these steps are the same with the first three steps above, and they are already done if the operations of traffic sharing is performed simultaneously in both directions)

NCM 48 instructs the Tandem Switch 46 to divert new incoming calls intended for subscribers of area A, to LE-B and mark them respectively as an extra incoming traffic intended to be routed via VC 50;

According to instructions of NCM 48, the extra-incoming voice traffic arriving to DSLAM-B is not transferred to xDSL lines, but routed via the VC 50;

According to instructions of NCM-48, the extra-incoming voice-traffic arriving to DSLAM-A via VC 50, is transferred to xDSL lines of area A.

The virtual circuits 50 comprise separate flows of traffic in both directions, forming, for example V5.2 tunnel "voice circuits". It should be noted that in the particular configuration shown in FIG. 3, where the Gateways do not form integral part of the DSLAMs, the virtual circuits 50 for diverting the voice-grade traffic may be formed not between DSLAMs of the cooperating access networks, but directly between DSLAM of the overloaded access network and Gateway of the assisting one. This option is actual both for incoming and outgoing voice-grade traffic.

The communication to the Network Control and Management unit (NCM) 48 could be implemented either by proprietary protocols between the various components of the network, or by utilizing the existing signaling protocols like SS7 and V5.2 (or GR-303).

Figure 4A:
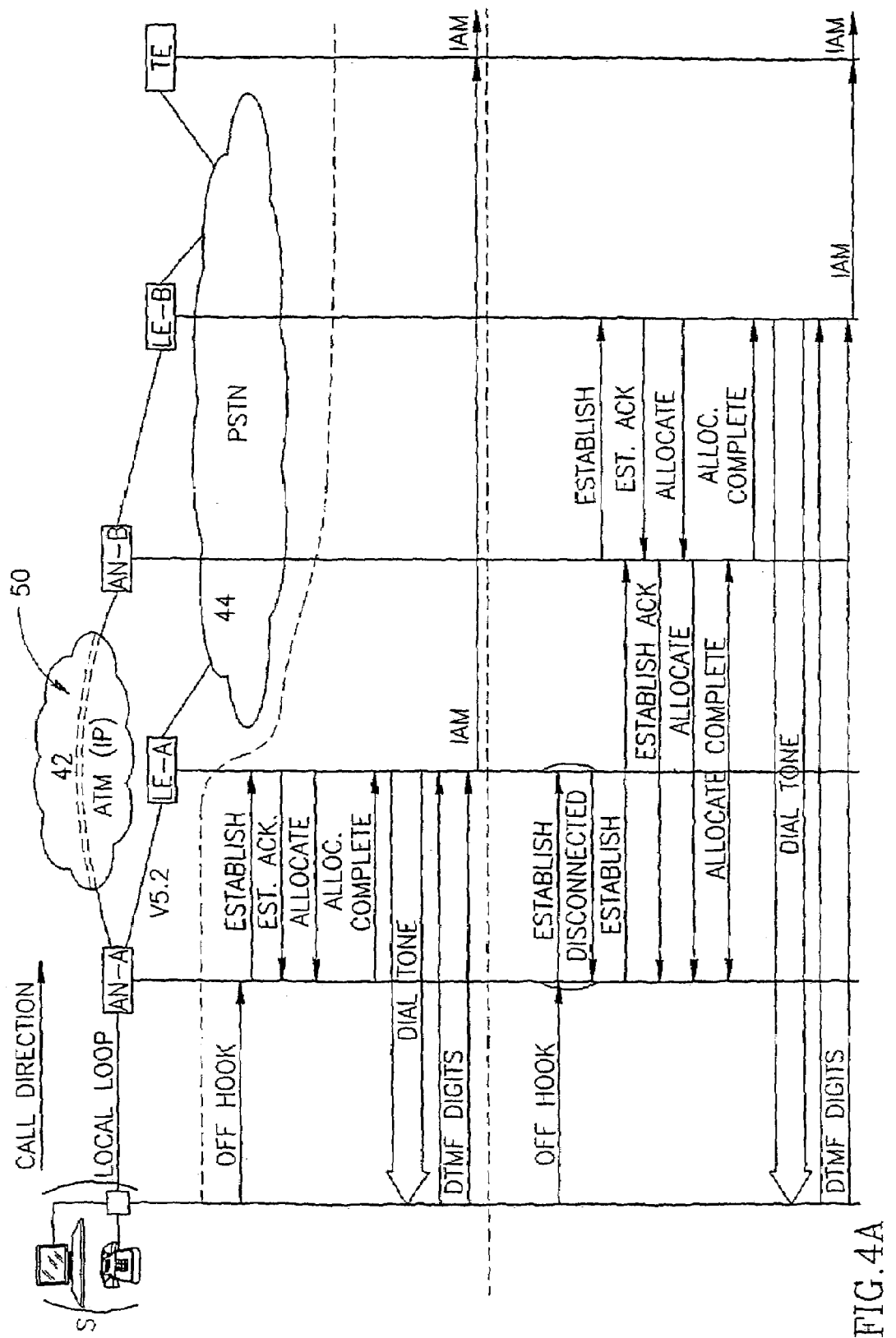
FIGS. 4a and 4b are schematic message flow representations of the control process taking place in the converged network when the proposed method is performed, for different call directions.

FIG. 4a schematically illustrates how the signaling information flows between elements of the system according to the invention, when the control means are decentralized and comprise control logical blocks (not shown) incorporated at least in the access nodes and tandem switches.

The control logical block of an access node (DSLAM) comprises a data bases for monitoring a) status of ports connecting the access node to the subscribers' local loops, b) status of channels available in the interface between the local exchange and the access node, and is operative to initiate forming virtual paths via the packet network when, based on the status information, the interface is considered overloaded. The virtual path can be built, for example, by initiating an additional signaling port for emulating a signaling channel via the packet network and by further emulating a plurality of voice-grade traffic circuits via the packet network. The number of signaling port, when received via the packet network and recognized by another access node & local exchange, would indicate that an extra voice-grade traffic, when received via the emulated circuits in the packet network, must not be rejected, but should be treated by the receiving local exchange. Of course, all this applies if the receiving local exchange it is not overloaded. To treat the diverted calls, the logical block of the receiving access node & central office preferably comprises a copy of the data base of the overloaded access node & data base with the map of its local ports. Providing such mutual copies of data bases in the converged network is only a matter of software and some additional memory, and is therefore much more economical than deploying new physical facilities for extending local exchanges.

FIG. 4a presents management of the traffic load sharing performed for the outgoing calls. The drawing is divided into three horizontal sections by two dotted lines.

The upper section of the drawing comprises a simplified diagram of a converged network comprising an ATM or IP network 42, a PSTN-like network 44, where two access nodes are marked AN-A and AN-B, respective local exchanges are marked LE-A and LE-B, interfaces there-between are V5.2 interfaces in this example, subscribers of AN-A are marked S, and TE (which constitutes a Tandem Exchange or Switch) plays part of a destination point.

The middle section of the drawing presents conventional signaling messages accepted in SS7 networks, which run between a subscriber S, its assigned local exchange LE-A and the tandem switch TE when the local exchange LE-A is not overloaded. Signaling message "off-hook" indicates to the equipment of access network AN-A that subscriber S lifted the telephone receiver; a message "establish" indicates that the equipment of AN-A requests establishing a channel in the interface for an outgoing call via the local exchange LE-A. If LE-A works in a normal condition, it sends back to AN-A a message "establish acknowledged" to confirm recognition of the access node, and a message "allocate" for connecting a free channel in the interface to a particular port number in the access node (which port is associated with the subscribers' local loop). The access network AN-A returns to the LE-A a message "allocation complete" signifying that the channel is allocated, after which the LE-A sends to the subscriber a dial tone which gives him an indication that he received a line. The subscriber dials a number he needs, and DTMF tones (coded digits of the number) are forwarded to the LE-A via the allocated channel. If the call was not local, i.e. was not addressed to a subscriber of the same local exchange, LE-A sends via the PSTN network 44 a so-called IAM (initial address message) to establish connection with the destination point. The IAM message transmits address and other information relating to the routing and handling of a call. The tandem switch TE, upon receiving the LAM signal, forwards it to a local exchange (not shown) serving the dialed number.

The lower section of the drawing comprises a modified set of messages which are performed when the local exchange AN-A is overloaded. The fact of overload results in the rejection of a new call outgoing from AN-A, so that the AN-A receives a message "establish Not acknowledged" or "Disconnect" from the LE-A. The logical block of the equipment of AN-A, in the situation of the interface overload, will send another "establish" message to equipment of the second access node AN-B, which forwards the message to its LE-B. The acknowledgement from the LE-B is forwarded by the AN-B to the AN-A, then the allocation messages exchange is performed between the AN-A and LE-B via the AN-B, and the dial tone is sent to the subscriber from the LE-B using the virtual voice channels 50 in the ATM network 42. (It should take less than one second to receive the dial tone after the off-hook.) After that, the DTMF digits dialed by the subscriber reach the LE-B via the same voice channels 50, and if the call was not directed to a number belonging to the LE-B, LE-B sends to the switch TE the IAM message for establishing the connection. The message is forwarded to its real destination.

Figure 4B:
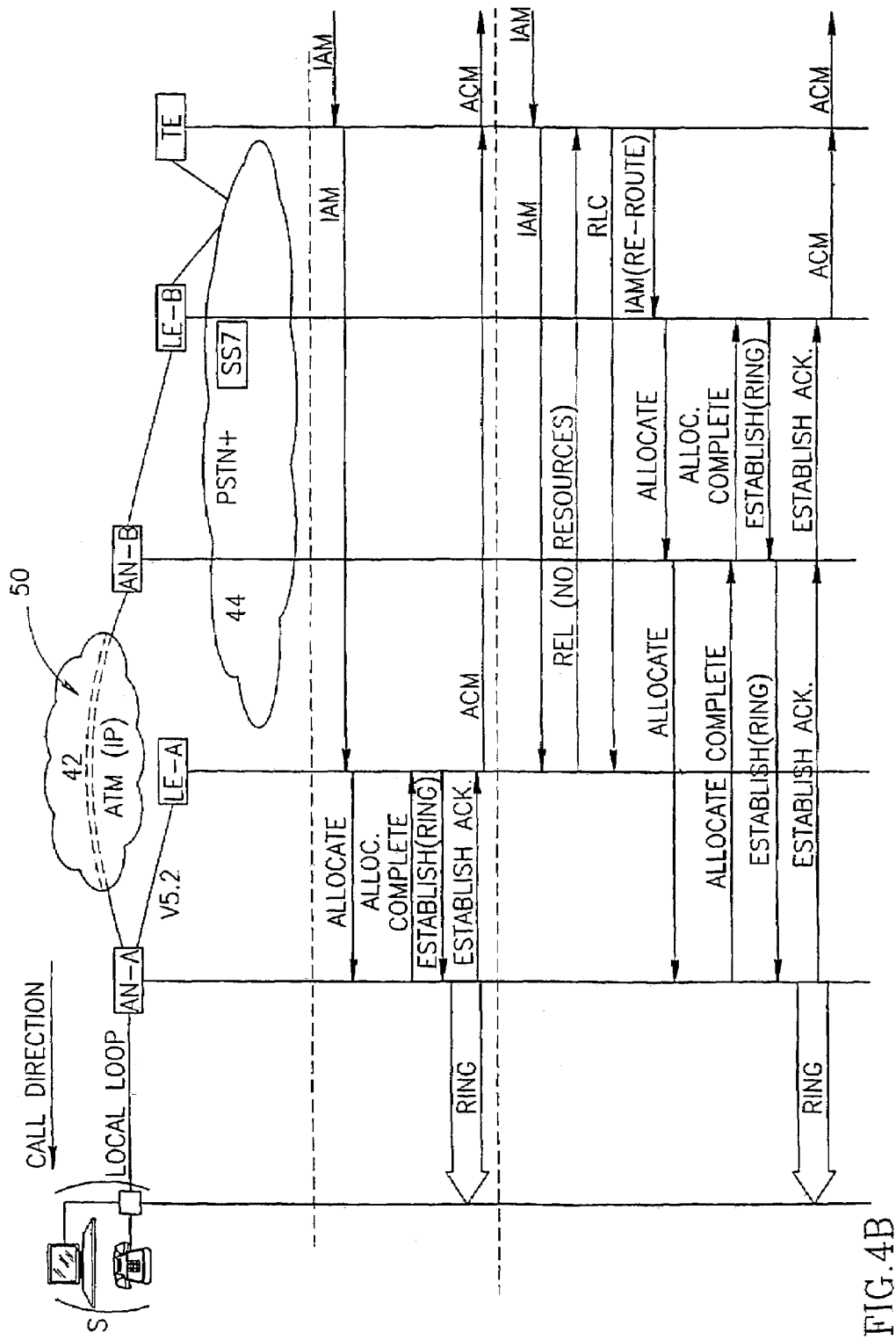

FIG. 4b illustrates succession of management messages taking place in the converged network in the direction of incoming traffic i.e., the traffic directed from PSTN to subscribes of a particular LE. Elements of the pictorial representation are marked identically to the respective ones shown in FIG. 4a. The three-section structure of the drawing is also similar to that of FIG. 4a. The message flow and routing in this case utilize a rerouting mechanism of protocol ISUP of SS7. ISUP (Integrated Services digital networks User Part) is the call control part of the SS7 protocol.

In the middle section of the drawing, a flow of signaling messages presents a normal call set-up via local exchange LE-A, i.e. in a situation when LE-A is in the normal load condition. Suppose, an Initial Address Message (IAM) arrives to a Tandem Exchange TE which "understands" that a call is to be established with a subscriber belonging to the local exchange LE-A. TE forwards the IAM to LE-A, and the latter issues an "allocate" message to the access network equipment AN-A. If a communication channel is available at AN-A, the LE-A receives from the AN-A a message "allocation complete". The local exchange LE-A is now capable of sending an Address Complete Message (ACM) to the Tandem Exchange TE to indicate that all the address signals required for routing the call to the called party have been received. Meanwhile, the local exchange LE-A sends a signal "establish" to the AN-A, and AN-A causes the subscriber's telephone set to ring. The AN-A then returns to the LE-A the signal "establish acknowledged" which indicates to the calling party that the telephone rings at the destination. When the subscriber lifts the receiver, the call is established via the PSTN network 44, as usual.

The lower section of the drawing illustrates how the signaling messages circulate to establish connection with the subscriber S, when the LE-A is overloaded. For example, by using the ISUP terminology and mechanism, the Tandem Exchange (TE), sending the IAM message to LE-A, is answered by a "release" message REL signifying that the local exchange LE-A does not have available resources to establish the call. This message can be issued based on the local exchange data base status. The TE confirms the end of its correspondence with LE-A by sending a message RLC which means "release complete".

Using the ISUP part of the SS7 protocol, the TE sends another (rerouted) message IAM to a local exchange which is presently below the predefined load threshold (e.g., LE-B). The LE-B sends a standard message "allocate" to its access node AN-B which, in a regular case, cannot confirm the message since the subscriber S cannot be allocated in AN-B. However, in the case when the rerouting is declared, the message "allocate" will be forwarded to the access network equipment AN-A. Due to the declared rerouting, the confirmation "allocation complete" is sent by the AN-A to the assisting local exchange LE-B (and not to its own local exchange LE-A), via the access node AN-B. Upon receipt of the "allocate complete", LE-B confirms to the TE (by message ACM) that address details of the called party are received. Meanwhile, the signal message ("establish ring") is sent from LE-B to AN-B but, due to the rerouting regime, this connection signal is rerouted to AN-A via the virtual circuits 50 in the ATM network. Upon receipt of the connection signal, the access node AN-A initiates the subscriber's phone ring and sends acknowledgement of the established ring to the access node AN-B which reports it to the local exchange LE-B. The local exchange LE-B informs the tandem switch TE, by the message ACM, that the called subscriber is allocated and being contacted.

To perform the method according to the invention and in particular—the above-described operations, there is required a computer program product comprising program code means stored in a computer readable medium for performing said method when the program is run on a computer. In one specific embodiment, the computer program product forms part of the NCM, and can particularly be designed for use in conjunction with a system SS7 and the interface V5.2 between the local exchanges and the access nodes.

By applying the proposed switching load sharing mechanism, the Inventor has resolved not only a problem of temporary overloads in local exchanges, but also the task of increasing a number of subscribers in an access network cooperating with a converged network, without upgrading the existing equipment of local exchanges though preserving the voice quality of service.

The proposed way has become possible unexpectedly or as a bonus due to efforts invested in resolving the problem of data traffic congestion. Indeed, before the converged networks and mixed access systems have appeared in the modem telecommunication world, there was no other way to increase the number of local subscribers, than by upgrading the local exchange (LE) capacity.

The invention claimed is:

1. A method for supporting a changing volume of a voice-grade traffic in an access network having a local exchange with a limited capacity, the method comprising steps of:
    providing two or more access networks, each having its subscribers and its associated local exchange with a limited capacity; each of the access networks being capable of dividing traffic, outgoing from its subscribers, into the voice-grade traffic portion and data traffic portion, and capable of directing the data traffic portion to a packet network while directing the voice-grade traffic portion to a PSTN network via said associated local exchange; wherein the PSTN network and the packet network are respectively common for said two or more access networks,
    defining an overload condition of a local exchange as a condition when traffic there-through equals to a predetermined threshold forming at least a portion of the local exchange capacity,
    defining a normal load condition of the local exchange as a condition when traffic there-through is below said predetermined threshold,
    detecting overload condition on one of said local exchanges, the overload local exchange being indicated LE1;
    finding a remaining one of said local exchanges being in its normal load condition, the non-overload local exchange being called LE2;
    partially diverting the voice-grade traffic intended for the local exchange LE1 and passing the diverted voice-grade traffic to its destination via said packet network and the local exchange LE2,
    thereby reducing volume of the voice-grade traffic via the LE1.

2. The method according to claim 1, wherein the step of defining the overload condition comprises assigning it to particular peak hours during daytime or night time, while the normal load condition is defined as condition during off-peak hours.

3. The method according to claim 1, wherein the step of defining the overload condition comprises defining the predetermined threshold as a value reflecting proportion of busy lines in the local exchange, and the step of detecting the overload condition comprises monitoring the local exchange.

4. The method according to claim 1, wherein the step of partially diverting the voice-grade traffic is performed by at least one of the following two ways:
    at least partially diverting the voice-grade traffic portion intended to enter the LE1 from the side of its subscribers;
    at least partially diverting the voice-grade traffic intended to enter the LE1 from the side of PSTN.

5. A system for supporting a changing volume of a voice-grade traffic in an access network having a local exchange with a limited capacity, wherein said access network forms part of a converged network comprising a PSTN network, a packet network and at least one additional access network, each of the access networks having its subscribers and its associated local exchange with a limited capacity and each being capable of dividing traffic, outgoing from its subscribers, into the voice-grade traffic stream and data traffic stream, and capable of directing the data traffic stream to the packet network while directing the voice-grade traffic stream to the PSTN network via said associated local exchange;
    the system comprising:
    control means capable of distinguishing between an overload condition and a normal condition of the local exchanges, and operative to cause at least partial diversion of the voice-grade traffic, previously intended for handling by the overload local exchange, and passing said diverted traffic via said packet network and a local exchange being in the normal load condition, wherein the overload condition of a particular local exchange is a condition when traffic there-through equals to a predetermined threshold forming at least a portion of said local exchange capacity, and the normal load condition of said local exchange is a condition when traffic there-through is below said threshold.

6. The system according to claim 5, wherein said control means comprise a plurality of control blocks respectively situated at said local exchanges and equipment associated therewith, wherein each of the control blocks is capable of monitoring a particular local exchange and its associated equipment for determining its load condition, and of applying to another local exchange to initiate said diversion if the overload condition is determined in said particular local exchange.

7. The system according to claim 5, wherein the control means constitute a central Network Control Management unit (NCM) capable of collecting load status information from the local exchanges and equipment associated therewith and of controlling said diversion accordingly.

8. The system according to claim 7, wherein said NCM is preprogrammed to consider a local exchange as overloaded during a particular period according to a predetermined time schedule, and to consider said local exchange in the normal load condition when said particular time period is completed.

9. The system according to claim 7, wherein said NCM is capable of arranging continuous monitoring the local exchanges' load condition and detecting the overload condition of any of them whenever its load exceeds the predetermined threshold.

10. The system according to any claim 5, wherein each of said access networks is provided with a DSLAM and a gateway associated with the local exchange of said network, the DSLAM being capable of receiving a digital format traffic flow received from the corresponding subscribers and sorting said flow into a data traffic stream and the voice-grade traffic stream, and of transmitting the data traffic stream via said packet network to its addressee, while the voice-grade traffic stream—via the gateway to its associated local exchange and further to the PSTN network.

11. The system according to claim 10, wherein said DSLAM, while sorting the digital format traffic flow received from the subscribers into the data traffic and the voice-grade traffic streams, is capable of controllably changing the proportion of the voice-grade traffic stream extracted from said flow for diverting at least a portion of said voice-grade traffic from said associated local exchange.

12. The system according to claim 10, wherein said control means is capable of arranging that the diverted traffic be controllably transmitted from the DSLAM (DSLAM-1) of an overloaded local exchange (LE1), via the packet network:
- either to the DSLAM (DSLAM-2) of another non-overloaded local exchange (LE2), then via the corresponding gateway to its non-overloaded local exchange,
- or directly to the gateway of the non-overloaded local exchange LE2.

13. The system according to claim 5, additionally provided with switching means to controllably divert part of the voice-grade traffic incoming an overloaded local exchange (LE1) from the PSTN network, to another, non-overloaded local exchange (LE2) for further transmitting it to subscribers of LE1 via the packet network.

14. A method for supporting a changing volume of a voice-grade traffic in an access node connected to a local exchange via an interface having a limited capacity, the method comprising steps of:
- providing two or more of said access nodes, each having its subscribers and its associated local exchange; each of said access nodes being capable of dividing traffic, outgoing from its subscribers, into the voice-grade traffic portion and data traffic portion, and capable of directing the data traffic portion to a packet network while directing the voice-grade traffic portion to a PSTN network via its associated local exchange; wherein the PSTN network and the packet network are respectively common for said two or more access nodes,
- defining an overload condition of a particular access node as a condition when traffic there-through equals to a predetermined threshold forming at least a portion of capacity of the interface between said particular access node and its associated local exchange,
- defining a normal load condition of the particular access node as a condition when traffic there-through is below said predetermined threshold,
- detecting overload condition on one of said access nodes, the overload access node being indicated AN1;
- finding one of the remaining access nodes being in its normal load condition when the AN1 is in its overload condition, the non-overload access node being called AN2;
- partially diverting the voice-grade traffic intended for the AN1 and passing the diverted voice-grade traffic to its destination via said packet network and the access node AN2, thereby reducing volume of the voice-grade traffic via the overload access node AN1.

15. The method according to claim 14, wherein said access nodes AN1 and AN2 belong to one and the same local exchange, thereby using one another as a shared resource.

16. The method according to claim 14, wherein each of said local exchanges is associated with one access node so that said AN1 and AN2 belong to different local exchanges, said local exchanges serve shared resources to one another.

17. A system for supporting a changing volume of a voice-grade traffic in an access node communicating with a local exchange via an interface having a limited capacity, wherein said access node forms part of a converged network comprising a PSTN network, a packet network and at least one additional access node; each of the access nodes having its subscribers and its associated local exchange communicating with the access node via a limited capacity interface, and each being capable of dividing traffic, outgoing from its subscribers, into the voice-grade traffic stream and data traffic stream, and capable of directing the data traffic stream to the packet network while directing the voice-grade traffic stream to the PSTN network via said associated local exchange;

the system comprising:
- control means capable of distinguishing between an overload condition and a normal condition of the access nodes, and operative to cause at least partial diversion of the voice-grade traffic, previously intended for handling by an overload access node, and passing said diverted traffic via said packet network and another access node being in the normal load condition, wherein
- the overload condition of an access node is a condition when traffic there-through equals to a predetermined threshold forming at least a portion of said interface capacity, and the normal load condition of the access node is a condition when traffic there-through is below said threshold.

18. The system according to claim 17, wherein the access node is a Digital Subscriber Line Access Multiplexer (DSLAM).

19. The system according to claim 17, wherein said control means constitute a plurality of logical circuits respectively incorporated in the access nodes; each of the logical circuits being capable of monitoring a particular access node, determining its load condition, and of applying to another access node to initiate said diversion of voice-grade traffic when the overload condition of the particular access node is determined.

20. The system according to claim 17, wherein said control means comprise a central network control and management entity capable of performing a centralized control based on information on the load status collected from the access nodes.

21. A computer program product comprising program code means stored in a computer readable medium for performing the method according to claim 1 when the program is run on a computer, the computer program product participating in accomplishing at least the following steps of the method:
- defining an overload condition of a particular local exchange as a condition when traffic there-through equals to a predetermined threshold forming at least a portion of the local exchange capacity,
- defining a normal load condition of the local exchange as a condition when traffic there-through is below said predetermined threshold,
- detecting the overload condition on one of said local exchanges, the overload local exchange being indicated LE1;
- simultaneously, detecting a normal condition on a remaining one of said local exchanges, the non-overload local exchange being called LE2;
- ensuring partial diversion of the voice-grade traffic intended for the local exchange LE1 and passing the diverted voice-grade traffic to its destination via said packet network and the local exchange LE2.

22. A computer program product comprising program code means stored in a computer readable medium for performing the method according to claim 14 when the program is run on a computer, the computer program product participating in accomplishing at least the following steps of the method:
- defining an overload condition of a particular access node as a condition when traffic there-through equals to a predetermined threshold forming at least a portion of capacity of the interface between said particular access node and its associated local exchange, defining a normal load condition of the particular access node as a condition when traffic there-through is below said predetermined threshold, detecting overload condition on one of said access nodes, the overload access node being indicated AN1;

finding one of the remaining access nodes being in its normal load condition when the AN1 is in its overload condition, the non-overload access node being called AN2;

ensuring partial diversion the voice-grade traffic intended for the AN1 and passing the diverted voice-grade traffic to its destination via said packet network and the access node AN2.

23. The computer program product according to claim 21, particularly designed for use in conjunction with an interface V5.2 and Signaling System 7.

24. The computer program product according to claim 22, particularly designed for use in conjunction with an interface V5.2 and Signaling System 7.

* * * * *